D. Brown,
Gate.
No. 102,365.  Patented Apr. 26, 1870.
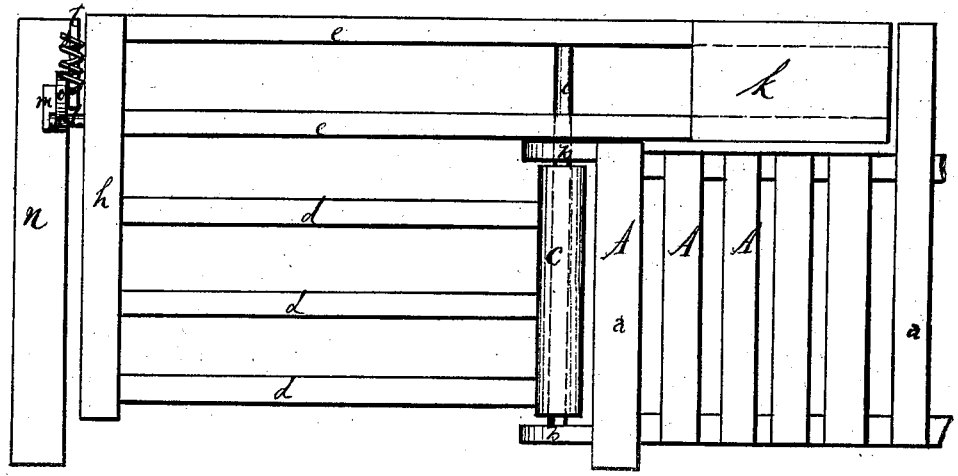
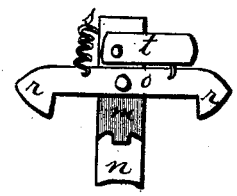
Witnesses.
C. O. Brown
Lysander Hill
David Brown, Inventor by
Geo. E. Brown, Atty.

United States Patent Office.

DAVID BROWN, OF HAMPDEN, MAINE.

Letters Patent No. 102,365, dated April 26, 1870.

IMPROVEMENT IN BALANCE-PIVOT GATE.

The Schedule referred to in these Letters Patent and making part of the same.

*To all whom it may concern:*

Be it known that I, DAVID BROWN, of Hampden, in the State of Maine, have invented a new and useful Improvement in Farm-Gates; and I do hereby declare that the following is a full, clear, and exact description of the same, reference being had to the accompanying drawings and letters of reference marked thereon, making a part of this specification, in which—

Figure 1 is a side elevation, and

Figure 2 is a detached view of the latch.

To enable those skilled in the art to make and use my invention, I now proceed to describe its construction and operation.

Similar letters in the drawings refer to like parts.

This invention consists of a gate in which any two of the horizontal bars are prolonged beyond the pivot post, the extremities of the prolonged parts being connected in such manner as to inclose a space for the reception of a weight, and, at the same time, bind the two bars together so as to form of them jointly a longitudinal brace for the gate, in combination with a self-fastening latch of a peculiar construction.

A is a section of a fence.

*a*, a vertical post fixed in any suitable manner at the end of the fence.

*b b*, are arms projecting horizontally from the post *a* in the same direction, one near its bottom, and the other near its top.

*c* is the pivot-post of the gate set in the arms *b*.

*d d d* are the three lower horizontal bars of the gate.

*e e* are the two upper horizontal bars supported in the end-post *h*, and on the journal-spindle *i*, projecting upward from the top of the pivot-post, and extending to a suitable distance beyond said spindle.

*k* is one of the pieces connecting the extremities of the prolonged parts of the bars *e*, there being similar connecting pieces on the other side of the bars, so as to form between them a space in which stones or some other heavy body may be placed to act as a counter weight, and so as to bind the bars *e* together, in order that they may form one brace, whereby the gate is greatly strengthened.

One of the bars *e* may project through the post *h*, so as to form a latch-pin, *l*.

A recess, *m*, is cut in the fixed vertical post *n* to receive the latch-pin.

A horizontal latch-bar, *o*, is pivoted at its center to the inner side of the post *n*, just above the recess *m*, said latch-bar having beveled ends *r r*, which allow the pin *l* to pass under and raise them from either side, and springs *s s*, which restore the latch-bar to its horizontal position as soon as the pin has entered the recess, and retain it therein.

For additional security a pivoted detent, *t*, may be dropped over the pin *l*, so as to prevent vertical displacement.

What I claim as new, and desire to secure by Letters Patent, is—

The bars *e e*, when so prolonged and bound together at the extremities of their extended parts as to form a joint brace, and afford an inclosed space for the reception of a counter weight, in combination with the pivoted latch-bar *o*, provided with beveled heads *r r*, springs *s s*, and detent *t*, in the manner and for the purpose specified.

DAVID BROWN.

Witnesses:
SAML. W. MATTHEWS,
H. P. DOANE.